United States Patent
Alberson et al.

(10) Patent No.: US 6,948,703 B2
(45) Date of Patent: Sep. 27, 2005

(54) LOCKING HOOK BOLT AND METHOD FOR USING SAME

(75) Inventors: Dean C. Alberson, Bryan, TX (US); Frederick Mauer, IV, Greenland, NH (US); D. Lance Bullard, Jr., College Station, TX (US); Roger P. Bligh, Bryan, TX (US); C. Eugene Buth, Wellborn, TX (US)

(73) Assignee: The Texas A&M University System, College Station, TX (US)

( * ) Notice: Subject to any disclaimer, the term of this patent is extended or adjusted under 35 U.S.C. 154(b) by 4 days.

(21) Appl. No.: 10/436,641

(22) Filed: May 13, 2003

(65) Prior Publication Data

US 2003/0215305 A1 Nov. 20, 2003

Related U.S. Application Data

(63) Continuation-in-part of application No. 10/355,601, filed on Jan. 30, 2003.
(60) Provisional application No. 60/380,549, filed on May 14, 2002, provisional application No. 60/380,632, filed on May 15, 2002, and provisional application No. 60/353,000, filed on Jan. 30, 2002.

(51) Int. Cl.[7] ................................................ E01F 15/00
(52) U.S. Cl. ........................... 256/13.1; 256/32; 256/47
(58) Field of Search .............................. 256/19, 1, 32, 256/47, 13.1

(56) References Cited

U.S. PATENT DOCUMENTS

| 79,141 | A | 6/1868 | McFarlin |
|---|---|---|---|
| 398,078 | A | 2/1889 | Peterson |
| 446,852 | A | 2/1891 | Davis |
| 629,185 | A | 7/1899 | Arnold |
| 1,329,492 | A | 2/1920 | Babcock |
| 1,473,118 | A | 11/1923 | Miller-Masury |
| 1,677,796 | A | 7/1928 | Parks |
| 2,089,929 | A | 8/1937 | Brickman et al. |

(Continued)

FOREIGN PATENT DOCUMENTS

| AT | 278890 | 2/1970 |
|---|---|---|
| AU | 603003 | 3/1989 |
| AU | A021844/88 | 11/1990 |

(Continued)

OTHER PUBLICATIONS

"Road Restraint Systems—Part 4: Barrier Systems . . . ", European Standard, Draft, PrEN 1317–4, Jun. 17–18, 1999, European Committee for Standardisation, Doc No.: 226/WG1/TG1/041, Contral Secretariat: rue de Stassart 36, B 6 1050 Brussels.

"Road Restraint Systems—Part 4: Performance Classes . . . ", British Standard, Oct. 18, 2002, © BSI, ENV 1317–4:2001 (E).

"Recommended Procedures for the Safety Performance Evaluation of Highway Features", NCHRP Report 350, National Cooperative Highway Research Program, Transportation Research Board.

(Continued)

*Primary Examiner*—John R. Cottingham
(74) *Attorney, Agent, or Firm*—Baker Botts L.L.P.

(57) ABSTRACT

A locking hook bolt, which may be used for securing cable to support posts in guardrail assemblies, and a method for using the same are provided. The locking hook bolt includes a first leg, a second leg, and an arcuate portion coupling the first and second legs such that the second leg extends generally parallel with, and spaced apart from, the first leg. A locking portion configured to engage a support post extends from, and forms an angle of approximately 90 degrees with, the second leg. The first leg of the locking hook bolt includes a threaded portion opposite the arcuate portion.

13 Claims, 3 Drawing Sheets

U.S. PATENT DOCUMENTS

| | | |
|---|---|---|
| 2,091,195 A | 8/1937 | Dennebaum |
| 2,123,167 A | 7/1938 | Cain |
| 2,135,705 A | 11/1938 | Florance |
| 2,146,333 A | 2/1939 | Deming |
| 2,146,445 A | 2/1939 | Russert et al. |
| RE22,060 E | 4/1942 | Hayden et al. |
| 2,309,238 A | 1/1943 | Corey |
| 2,321,988 A | 6/1943 | Brickman |
| 2,735,251 A | 2/1956 | Dlugosch |
| 2,776,116 A | 1/1957 | Brickman |
| 3,185,445 A | 5/1965 | Broadway |
| 3,308,584 A | 3/1967 | Graham |
| 3,332,666 A | 7/1967 | Gray |
| 3,349,531 A | 10/1967 | Watson |
| 3,385,564 A | 5/1968 | Persicke |
| 3,417,965 A | 12/1968 | Gray |
| 3,450,233 A | 6/1969 | Massa |
| 3,499,630 A | 3/1970 | Dashio |
| 3,519,301 A | 7/1970 | Somnitz |
| 3,521,917 A | 7/1970 | King |
| 3,567,184 A | 3/1971 | Yancey |
| 3,606,222 A | 9/1971 | Howard |
| 3,617,076 A | 11/1971 | Attwood |
| 3,637,244 A | 1/1972 | Strizki |
| 3,643,924 A | 2/1972 | Fitch |
| 3,680,448 A | 8/1972 | Ballingall et al. |
| 3,693,940 A | 9/1972 | Kendall et al. |
| 3,711,881 A | 1/1973 | Chapman et al. |
| 3,768,781 A | 10/1973 | Walker et al. |
| 3,776,520 A | 12/1973 | Charles et al. |
| 3,820,906 A | 6/1974 | Katt |
| 3,846,030 A | 11/1974 | Katt |
| 3,856,268 A | 12/1974 | Fitch |
| 3,912,404 A | 10/1975 | Katt |
| 3,919,380 A | 11/1975 | Smarook et al. |
| 3,925,929 A | 12/1975 | Montgomery |
| 3,951,556 A | 4/1976 | Strizki |
| 3,967,906 A | 7/1976 | Strizki |
| 3,972,510 A | 8/1976 | Dougherty |
| 3,981,486 A | 9/1976 | Baumann |
| 3,982,734 A | 9/1976 | Walker |
| 4,000,882 A | 1/1977 | Penton |
| 4,063,713 A | 12/1977 | Anolick et al. |
| 4,071,970 A | 2/1978 | Strizki |
| 4,126,403 A | 11/1978 | Sweeney et al. |
| 4,183,695 A | 1/1980 | Wilcox |
| 4,190,275 A | 2/1980 | Mileti |
| 4,200,310 A | 4/1980 | Carney, III |
| 4,236,843 A | 12/1980 | Chisholm |
| 4,269,384 A | 5/1981 | Saeed et al. |
| 4,278,228 A | 7/1981 | Rebentisch et al. |
| 4,295,637 A | 10/1981 | Huleck |
| 4,330,106 A | 5/1982 | Chisholm |
| 4,351,617 A | 9/1982 | Landa |
| 4,352,484 A | 10/1982 | Gertz et al. |
| 4,389,134 A | 6/1983 | Colas |
| 4,399,980 A | 8/1983 | van Schie |
| 4,432,172 A | 2/1984 | Kuykendall et al. ............ 52/98 |
| 4,452,431 A | 6/1984 | Stephens et al. |
| 4,490,062 A | 12/1984 | Chisholm |
| 4,583,716 A | 4/1986 | Stephens et al. |
| 4,607,824 A | 8/1986 | Krage et al. |
| 4,645,375 A | 2/1987 | Carney, III |
| 4,646,489 A | 3/1987 | Feller et al. |
| 4,655,434 A | 4/1987 | Bronstad |
| 4,674,911 A | 6/1987 | Gertz |
| 4,678,166 A | 7/1987 | Bronstad et al. |
| 4,729,690 A | 3/1988 | Lavender et al. |
| 4,784,515 A | 11/1988 | Krage et al. |
| 4,815,565 A | 3/1989 | Sicking et al. |
| 4,838,523 A | 6/1989 | Humble et al. |
| 4,852,847 A | 8/1989 | Pagel |
| 4,923,319 A | 5/1990 | Dent |
| 4,926,592 A | 5/1990 | Nehls |
| 4,928,446 A | 5/1990 | Alexander, Sr. |
| 4,928,928 A | 5/1990 | Buth et al. |
| 4,986,687 A | 1/1991 | Ivey |
| 5,011,326 A | 4/1991 | Carney, III |
| 5,022,782 A | 6/1991 | Gertz et al. |
| 5,054,954 A | 10/1991 | Cobb et al. |
| 5,069,576 A | 12/1991 | Pomero |
| 5,078,366 A | 1/1992 | Sicking et al. |
| 5,112,028 A | 5/1992 | Laturner |
| 5,203,543 A | 4/1993 | Fleury |
| 5,214,886 A | 6/1993 | Hughron |
| 5,244,101 A * | 9/1993 | Palmer et al. .................. 211/5 |
| 5,248,129 A | 9/1993 | Gertz |
| 5,286,137 A | 2/1994 | Cincinnati et al. |
| 5,391,016 A | 2/1995 | Ivey et al. |
| 5,403,112 A | 4/1995 | Carney, III |
| 5,407,298 A | 4/1995 | Sicking et al. |
| 5,481,835 A | 1/1996 | Bloom |
| 5,484,217 A | 1/1996 | Carroll et al. |
| 5,503,495 A | 4/1996 | Mak et al. |
| 5,547,309 A | 8/1996 | Mak et al. |
| 5,647,520 A * | 7/1997 | McDaid ....................... 224/425 |
| 5,657,966 A | 8/1997 | Cicinnati |
| 5,660,375 A | 8/1997 | Freeman |
| 5,664,905 A | 9/1997 | Thompson et al. ......... 256/13.1 |
| 5,733,062 A | 3/1998 | Oberth et al. |
| 5,746,419 A | 5/1998 | McFadden et al. |
| 5,775,675 A | 7/1998 | Sicking et al. ............. 256/13.1 |
| 5,797,591 A | 8/1998 | Krage ........................ 256/13.1 |
| 5,797,592 A | 8/1998 | Machado |
| 5,823,584 A | 10/1998 | Carney, III |
| 5,832,762 A * | 11/1998 | McDaid ........................ 70/455 |
| 5,851,005 A | 12/1998 | Muller et al. |
| 5,855,443 A | 1/1999 | Faller et al. |
| 5,924,680 A | 7/1999 | Sicking et al. ............. 256/13.1 |
| 5,931,448 A | 8/1999 | Sicking et al. ............. 256/13.1 |
| 5,957,435 A | 9/1999 | Bronstad .................... 256/13.1 |
| 5,966,867 A * | 10/1999 | Downer et al. ................. 47/46 |
| 5,988,598 A | 11/1999 | Sicking et al. ............. 256/13.1 |
| 5,992,828 A * | 11/1999 | Burdick ........................ 256/10 |
| 6,007,269 A | 12/1999 | Marinelli ....................... 404/6 |
| 6,022,003 A | 2/2000 | Sicking et al. |
| 6,065,894 A | 5/2000 | Wasson et al. ................. 403/2 |
| 6,092,959 A | 7/2000 | Leonhardt et al. |
| 6,109,597 A | 8/2000 | Sicking et al. ............. 256/13.1 |
| 6,116,805 A | 9/2000 | Gertz |
| 6,129,342 A | 10/2000 | Bronstad .................... 256/13.1 |
| 6,168,346 B1 | 1/2001 | Ernsberger |
| 6,203,079 B1 | 3/2001 | Breed |
| 6,210,066 B1 | 4/2001 | Dent ............................ 403/2 |
| 6,220,575 B1 | 4/2001 | Lindsay et al. ............. 256/13.1 |
| 6,244,571 B1 | 6/2001 | Reid et al. .................. 256/13.1 |
| 6,254,063 B1 | 7/2001 | Rohde et al. ............... 256/13.1 |
| 6,260,827 B1 | 7/2001 | Sicking et al. ............. 256/13.1 |
| 6,272,796 B1 | 8/2001 | Metzler |
| 6,290,427 B1 | 9/2001 | Ochoa |
| 6,299,141 B1 | 10/2001 | Lindsay et al. ............. 256/13.1 |
| 6,308,809 B1 | 10/2001 | Reid et al. .................. 188/377 |
| 6,340,268 B1 | 1/2002 | Alberson et al. |
| 6,347,904 B1 | 2/2002 | Knighton |
| 6,398,192 B1 | 6/2002 | Albritton ................... 256/13.1 |
| 6,409,156 B2 | 6/2002 | Dent ......................... 256/13.1 |
| 6,416,041 B1 | 7/2002 | Sicking et al. |
| 6,435,761 B1 | 8/2002 | Bligh et al. |
| 6,461,076 B1 | 10/2002 | Stephens et al. |
| 6,488,268 B1 | 12/2002 | Albritton |
| 6,554,256 B2 | 4/2003 | Ochoa ....................... 256/13.1 |

| | | | |
|---|---|---|---|
| 6,609,343 | B1 | 8/2003 | Litten |
| 6,637,971 | B1 | 10/2003 | Carney, III et al. |
| 6,644,888 | B2 | 11/2003 | Ochoa |
| 2001/0013596 | A1 | 8/2001 | Sicking et al. |
| 2001/0048101 | A1 | 12/2001 | Bligh et al. |
| 2002/0007994 | A1 | 1/2002 | Reid et al. |
| 2002/0179894 | A1 | 12/2002 | Albritton |
| 2003/0015695 | A1 | 1/2003 | Alberson et al. |
| 2003/0168650 | A1 | 9/2003 | Alberson et al. |
| 2003/0213946 | A1 | 11/2003 | Alberson et al. |
| 2003/0215305 | A1 | 11/2003 | Alberson et al. |

FOREIGN PATENT DOCUMENTS

| | | |
|---|---|---|
| DE | 1 916 361 | 3/1963 |
| DE | 1534526 | 11/1965 |
| DE | 3708861 A1 | 10/1988 |
| EP | 0 245 042 | 11/1987 |
| EP | 0 924 347 A1 | 6/1999 |
| FR | 2 386 667 | 4/1977 |
| FR | 77 11540 | 3/1978 |
| FR | 2546932 | 6/1983 |
| GB | 2023695 A | 1/1980 |
| JP | 10 18255 | 1/1989 |
| LU | 40465 | 10/1961 |
| LU | 41444 | 5/1962 |
| WO | WO 96/20311 | 4/1996 |
| WO | 98/50637 | 11/1998 |
| WO | 00/40805 | 7/2000 |

OTHER PUBLICATIONS

"BEAT Box Beam Bursting Energy Absorbing Terminal", RSI Road Systems, Inc., http://www.roadsystems.com/beat.htm.

International Search Report for PCT/US98/09029, Sep. 1, 1998.

International Search Report for PCT/US99/30463, Apr. 28, 2000.

International Preliminary Examination Report for PCT/US98/09029, Jul. 12, 2000.

International Preliminary Examination Report for PCT/US99/30463, Apr. 24, 2001.

Written Opinion for PCT/US98/09029, Mar. 29, 2000.

Written Opinion for PCT/US99/30463, Nov. 22, 2000.

U.S. Appl. No. 09/943,727, entitled: *ET–PLUS: Head Assembly for Guardrail Extruder Terminal*, Aug. 31, 2001.

U.S. Appl. No. 10/308,296, entitled: *Stell Yielding Guardrail Support Post*, Dec. 2, 2002

ET–2000 The Future of Highway Safety—SYRO (Printed in Dec. 1990; revised Oct. 1992).

Bronstad, et al., *Modified Breakaway Cable Terminals for Guardrails and Median Barriers,* Research Results Digest, NCHRP, Transportation Research Board, Digest 12, May 1978.

*Breakaway Metal Post for Highway Guardrail End Treatments*, U.S. Appl. No. 09/074,496 filed May 7, 1998, James R. Albritton.

*Breakaway Support Post for Highway Guardrail End Treatments*, U.S. Appl. No. 09/358,017 filed Jul. 19, 1999, James R. Albritton.

Notification of International PCT Search Report for International Patent Application No. PCT/US03/02998 filed Jan. 30, 2003 ( 7 pages), May 28, 2003.

U.S. Appl. No. 09/679,902, filed Oct. 5, 2000, by Ross, et al., and entitled: *Improved Guardrail Terminals,* status is pending.

"*INFORMATION: Report 350Acceptance of New York 3–Strand Cable Terminal*", Memorandum No. HMH-S–CC63 from Dwight A. Horne, Director, Office Highway Safty Infrastructure, U.S. Department of Transportation, Federal Highway Administration, to Resource Center Directors, Division Administrators and Federal Lands Highway Division Engineers, 2 pages Memorandum and 3 pages of Attachments, Feb. 14, 2000.

PCT Written Opinion for International Application No. PCT/US03/15002, filed May 13, 2003.

Notification of Transmittal of The International Search Report, PCT application No. PCT/US03/15002, date of mailing Aug. 14, 2003 referencing the above cited art.

\* cited by examiner

LOCKING HOOK BOLT AND METHOD FOR USING SAME

RELATED APPLICATIONS

The present application is a continuation-in-part of U.S. Ser. No. 10/355,601, filed Jan. 30, 2003, entitled Cable Guardrail Release System. The present application claims the benefit of U.S. Provisional Application Ser. No. 60/380,549 filed May 14, 2002 entitled Locking Hook Bolt, U.S. Provisional Application Ser. No. 60/380,632 filed May 15, 2002, entitled Cable Guardrail Terminal, and. U.S. Provisional Application Ser. No. 60/353,000 filed Jan. 30, 2002, entitled Cable Guardrail Terminal.

TECHNICAL FIELD OF THE INVENTION

The present invention relates in general to field of bolt assemblies and, in particular, to a locking hook bolt and a method for using the same.

BACKGROUND OF THE INVENTION

Guardrail systems are commonly used along highways and other roadways to prevent or reduce damage to vehicles and their occupants when they leave the road. These guardrails are designed to redirect the vehicle back onto the roadway and absorb the energy from the errant vehicle in a controlled manner.

One such guardrail design employs cables or wire ropes strung between, and coupled to, a plurality of support posts to restrain vehicles to the road. These cables or wire ropes may be coupled to the support post using a variety of bolt members, such as "J-shaped" bolts or other hook-type bolt members. In this manner, the cables distribute the force of the impact of an errant vehicle among the support posts to which they are coupled.

Despite their widespread use, some previous cable guardrail systems have suffered from a variety problems relating to the premature release of the cables from the support posts due to the failure of the bolt members employed to fasten the cables. Due to this premature release, the force of the impact of an errant vehicle is distributed among fewer support posts than originally intended. This can lead to increased deflection of the system, increasing guardrail maintenance costs and leaving the guardrail systems less able to withstand subsequent impacts from other errant vehicles.

SUMMARY OF THE INVENTION

In accordance with the present invention, a locking hook bolt, which may be used for securing cable to support posts in guardrail assemblies, and a method for using the same are provided. The locking hook bolt comprises a first leg, a second leg, and an arcuate portion coupling the first and second legs such that the second leg extends generally parallel with, and spaced apart from, the first leg. A locking portion configured to engage a support post extends from the second leg, forming an angle of approximately 90 degrees with the second leg. On the opposite end of the locking hook bolt, the first leg of the locking hook bolt includes a threaded portion opposite the arcuate portion, which may be threadably coupled with a nut, with or without a lock washer.

A technical advantage of particular embodiments of the present invention includes the ability to create a stronger connection to support posts due to the shape of the locking hook bolt along with its threaded portion, which secure both ends of the locking hook bolt to the support post. This permits the strength of the post to be fully utilized to dissipate the energy of an errant vehicle before the release of the wire ropes from the support post.

Another technical advantage of particular embodiments of the present invention is a reduction in the number of premature releases of wire ropes upon impact by errant vehicles. This allows more of the load from an errant vehicle to be transmitted to more adjacent support posts, spreading the load among more support posts and, thus, decreasing system deflections upon impact by errant vehicles.

Yet another technical advantage of particular embodiments of the present invention is that the strength of the locking hook bolt can be adjusted to match the strength of the support post. This can be accomplished by varying the material properties or diameter of the steel round stock from which the locking hook bolt is fabricated, and/or adjusting the length of the locking portion extending from the second leg of the locking hook bolt. In this manner, the strength of the post may be more fully utilized, but the cable is allowed to release from the support post as the capacity of the post is reached. This not only prevents the premature release of the cable from the support post, but also prevents the cable from being pulled down as the support post deforms, thus reducing the potential for vehicles to override the system.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

In accordance with particular embodiments of the present invention, a locking hook bolt and method for using the same are provided. The locking hook bolt allows cable to be securely fastened to a support post in a guardrail system that is used to restrain errant vehicles to a roadway, such that the overall instances of premature release and system deflections are reduced. This is due, at least in part, to the fact that the shape of the bolt, in connection with its threaded section, serves to create a stronger connection to the support posts.

Figure 1:
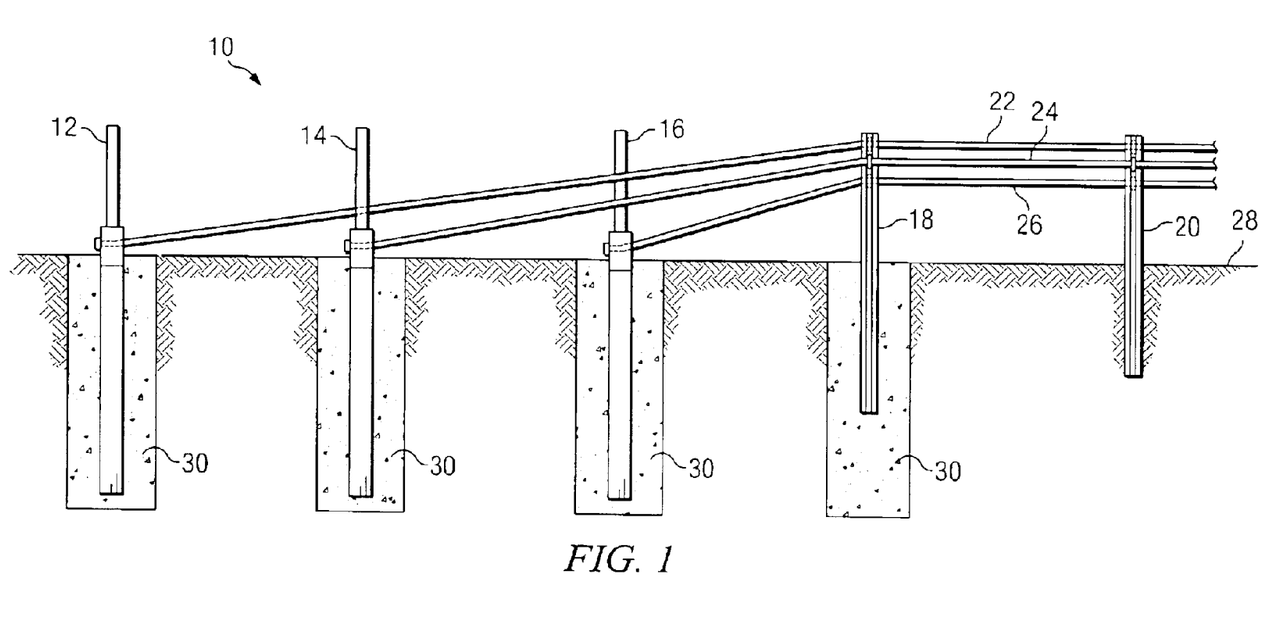
FIG. 1 illustrates a side-view of a cable guardrail system that incorporates a locking hook bolt assembly, in accordance with a particular embodiment of the present invention.

FIG. 1 illustrates a portion of a cable guardrail system 10, in accordance with a particular embodiment of the present invention, in which a plurality of locking hook bolts are used to secure a plurality of cables to the support posts of the guardrail assembly. Cable guardrail system 10 may be installed adjacent to a roadway to protect vehicles, drivers, and passengers from various obstacles and hazards and to prevent vehicles from leaving the roadway during a traffic accident or other hazardous condition. Furthermore, cable guardrail systems in accordance with embodiments of the present invention may be used in median strips or shoulders of highways, roadways, or any path that is likely to encounter vehicular traffic.

As shown in FIG. 1, the illustrated portion of cable guardrail system 10 includes intermediate support posts 18 and 20 and cable release anchor posts 12, 14, and 16. Intermediate support posts 18 and 20 provide support to upper cable 22, middle cable 24, and lower cable 26, all of which may comprise wire rope, such as 19 mm (0.748 in) diameter 3×7 wire rope, or other types of cables or steel strands. Although only three cables are illustrated, it should also be recognized by one of ordinary skill in the art that other embodiments may include other numbers of cables, as well. Furthermore, for the purposes of this application, cable refers to cable, wire rope, and/or steel strands.

Cable guardrail system 10 also includes a plurality of cable release anchor posts 12, 14, and 16. Cables 22, 24, and 26 are each anchored by, or coupled to, cable release anchor posts 12, 14, and 16, respectively, proximate ground surface 28. However, other embodiments may include other numbers of cable release anchor posts, as well as other number of cables. Furthermore, cable guardrail release systems in accordance with other embodiments may also include terminal systems with more than one cable coupled to a single cable release anchor post.

In addition to being secured to an cable release anchor post, each of cables 22, 24, and 26 are also secured to intermediate support posts 18 and 20, which support the cables in a generally horizontal and parallel relation above ground surface 28.

In the illustrated embodiment, cable release anchor posts 12, 14, and 16, and intermediate support post 18 are securely anchored in concrete footers 30. However, other embodiments may utilize other methods to secure the support or anchor posts to a ground surface, as shown by intermediate post 20 which is merely inserted into ground surface 28. Other embodiments may also utilize sleeves, foundation tubes, ground struts, or trapezoidal soil plates to accomplish a similar result.

Figure 2:
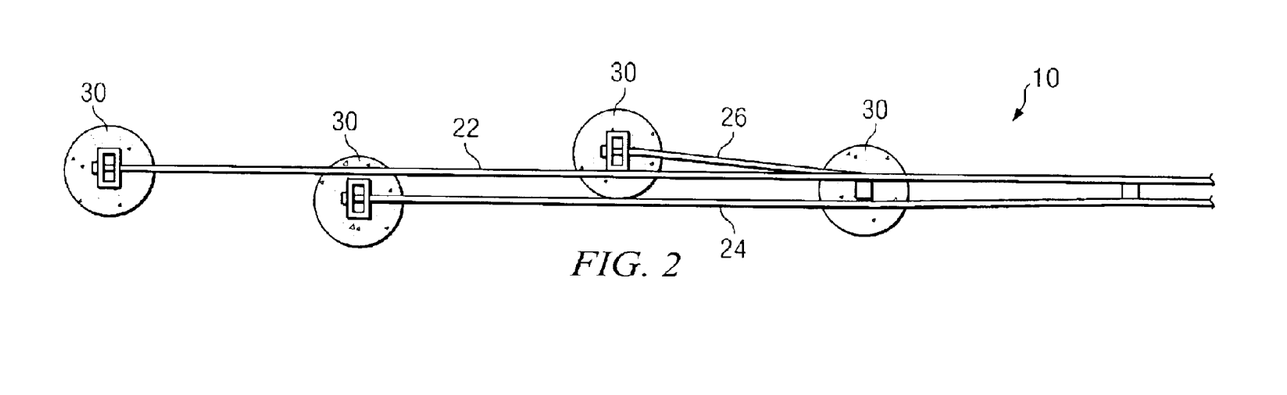
FIG. 2 illustrates a top-view of the cable guardrail system depicted in FIG. 1.

FIG. 2 illustrates a top view of the portion of the cable guardrail system shown in FIG. 1. As shown in this particular embodiment, upper cable 22 and lower cable 26 are secured to one side of intermediate support posts 18 and 20, while middle cable 24 is secured to the other side of intermediate support posts 18 and 20. This configuration may be particularly suited for installation in a median. Cables in other embodiments may be secured to support posts in other ways or configurations, as well. For example, in some embodiments each cable may be secured to the traffic side of the intermediate support posts. Such a configuration may be particularly suited for roadside, as opposed to median, installation.

Of course, it should be understood that cable release anchor posts 12, 14, and 16 of FIGS. 1 and 2 make up only one terminal of a complete cable guardrail release system 10. Thus, cable guardrail release system 10 may include an opposite terminal that includes a number of cable release anchor posts and one or more intermediate support posts between the terminals. Such opposite terminal may be constructed in essentially the same manner as the terminal illustrated in FIGS. 1 and 2. The portion of a guardrail system between and including the intermediate support posts is referred to in the art as the system's "length of need." Thus, the length of need section of a cable guardrail safety system may include the intermediate support posts of the system as well as the portions of the cables that run between the intermediate support posts, such as the portions of cables 22, 24, and 26 that run between intermediate support posts 18 and 20 and any other intermediate support post of the system.

Figure 3:
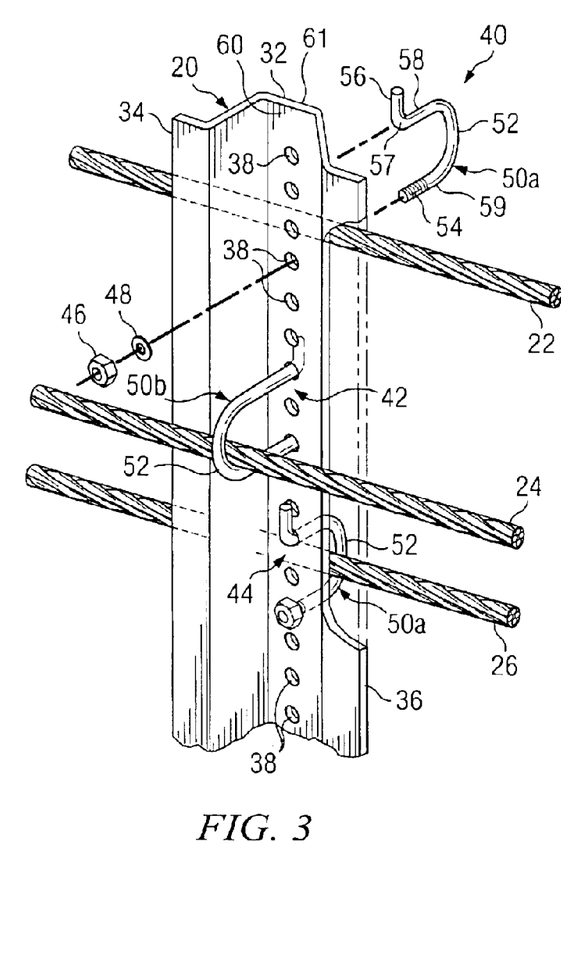
FIG. 3 illustrates a close-up, isometric, partially exploded view of the upper end of a "U-shaped" support post depicting a manner of securing cables to the support post using locking hook bolt assemblies.
Figure 4:
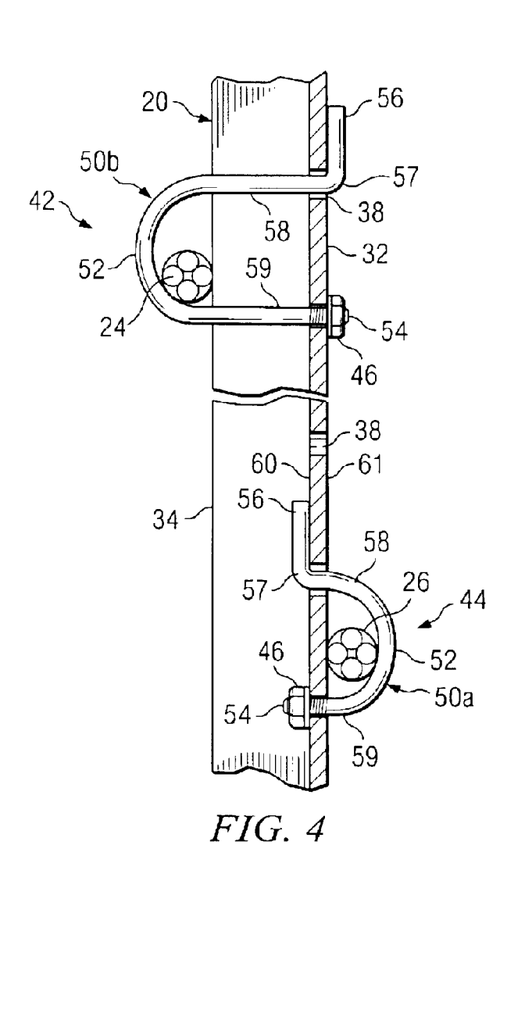
FIG. 4 illustrates a side-view of the arrangement depicted in FIG. 3.

FIG. 3 illustrates an isometric view of a portion of intermediate support post 20, also shown in FIG. 1 and 2. A side-view of a portion intermediate support post 20 is shown in FIG. 4.

As shown in FIG. 3, intermediate support post 20 includes an approximately "U-shaped" cross-section with a central web portion 32 and a pair of oppositely directed flanges 34 and 36. It should be understood by those of skill in the art, however, that support posts having other cross-sections may also be used, including "C-shaped", "Z-shaped", "I-shaped", "S-shaped", "L-shaped", "M-shaped", and "W-shaped" support posts. A plurality of apertures 38 are disposed through the central web portion 32 of support post 20.

Upper and lower cables 22 and 26 run along and are secured to one side of support post 20, side 61, while middle cable 24 runs along and is secured to an opposite side of support post 20, side 60. This arrangement helps to accommodate impacts on either side of cable guardrail system 10 (FIG. 1). Such impacts on either side of the cable guardrail system might be expected when the system is installed in a median. Alternatively, other embodiments of the present invention may employ cables secured to one (the same) side of a support post. Such an arrangement helps to accommodate impacts on one side of the cable guardrail system, which might be expected when the system is installed along a roadway.

Cables 22, 24, and 26 are reversibly secured to support post 20 by locking hook bolt assemblies 40, 42, and 44, respectively. Each of the assemblies 40, 42, 44 comprises a bolt member 50 having a generally cylindrical, unitary body, which may be constructed of 5/16 inch diameter round, Rockwell A Hardness 60 field material, or some other suitable material.

Each bolt member 50 includes a first leg 59 and a second leg 58, which extends generally parallel with, and spaced apart from first leg 59. First leg 59 and second leg 58 are coupled by a U-shaped, arcuate portion 52. Opposite this arcuate portion 52, first leg 59 includes a threaded portion 54, to which a nut 46 may be threadably affixed. Additionally, a lock washer 48 may optionally be used in coupling nut 46 to bolt member 50.

Particular embodiments of the locking hook bolt may also include a shoulder (not illustrated) disposed between threaded portion 54 and the remainder of the first leg 59. This shoulder may be configured to engage one side of central web 32 while nut 46 engages the other side of the central web. As such, the shoulder helps to form a stronger, more rigid coupling between support post 20 and bolt member 50. Alternatively, in place of a shoulder, other embodiments of the locking hook bolt may use a second nut (not illustrated) coupled with threaded portion 54 to serve a similar purpose. Like the addition of a shoulder, the addition of the second nut also helps to form a stronger, more rigid coupling between support post 20 and bolt member 50.

Opposite threaded portion 54, each bolt member 50 also includes a substantially straight, locking portion 56 that forms an approximately 90 degree angle with second leg 58 by virtue of bend 57, and which is configured to engage support post 20 of guardrail system 10.

In operation, locking hook bolt members 50 cooperate to secure cables 22, 24, and 26 to the support post 20 of guardrail system 10. For each of the cables 22, 24, 26, the arcuate portions 52 of the bolt members 50 are placed adjacent the body of the cable to be secured.

To install a locking hook bolt assembly 40, 42, or 44, the locking portion 56 of the bolt member 50 is inserted through one of the apertures 38 in support post 20. The bolt member 50 is then rotated downwardly (or upwardly depending upon the direction of insertion) so that bend 57 is disposed within the aperture. The threaded portion 54 is then inserted through a respective aperture 38 proximate the aperture through which locking portion 56 is inserted. Washer 48 and nut 46 are then coupled to threaded portion 54 to secure bolt member 50 to support post 20.

FIGS. 3 and 4 also illustrate two varieties of bolt members 50, which are referred to herein as bolt members 50a and 50b, respectively. The difference between the two varieties is best shown in FIG. 4. As is apparent from the illustration, first and second legs 59 and 58 of bolt member 50a are shorter in length than the first and second legs 59 and 58 of bolt member 50b. This is due to the fact that the lengths of legs 58 and 59 of bolt members 50a and 50b are chosen to allow the bolt members to couple cables to support post 20 in two different orientations.

The lengths of legs 58 and 59 of bolt member 50a are selected to allow locking portion 56 of bolt member 50a to engage side 60 of central web 32 while arcuate portion 52 of bolt member 50a extends beyond the opposite side of the central web 32, side 61, by an amount sufficient to couple cable 26 to that side, securing the cable within arcuate portion 52.

In contrast, legs 58 and 59 of bolt member 50b are selected to allow locking portion 56 of bolt member 50b to engage side 61 of central web 32, while arcuate portion 52 of bolt member 50b extends beyond flanges 34 and 36 by an amount sufficient to couple cable 24 with the flanges, securing the cable within the arcuate portion 52.

Because of these different lengths of legs 58 and 59 of bolt members 50, bolt member 50b is suitable for securing a cable in intimate contact with the flanges 34 and 36 of support post 20, whereas bolt member 50a is suitable for securing a cable in intimate contact with the central web 32 of support post 20.

Figure 5:
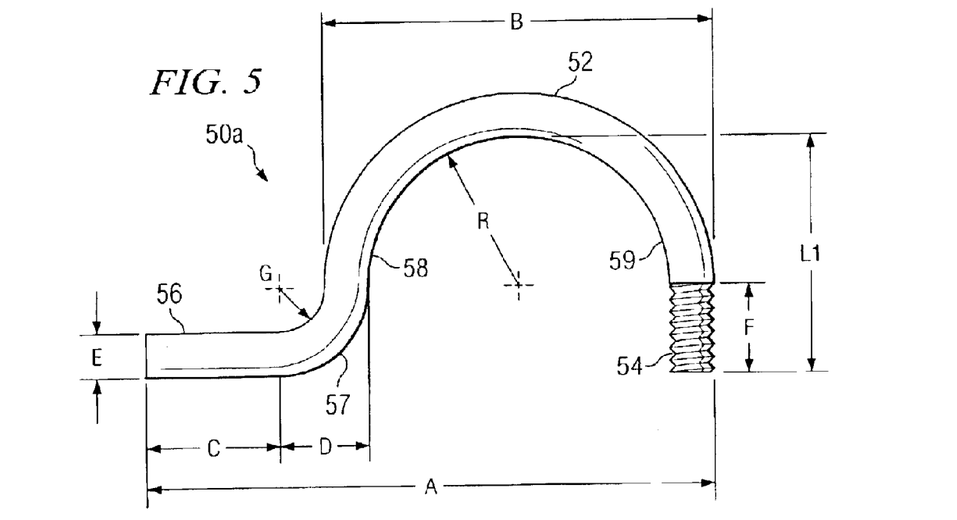
FIG. 5 illustrates a side-view of a locking hook bolt member in accordance with a particular embodiment of the present invention.
Figure 6:
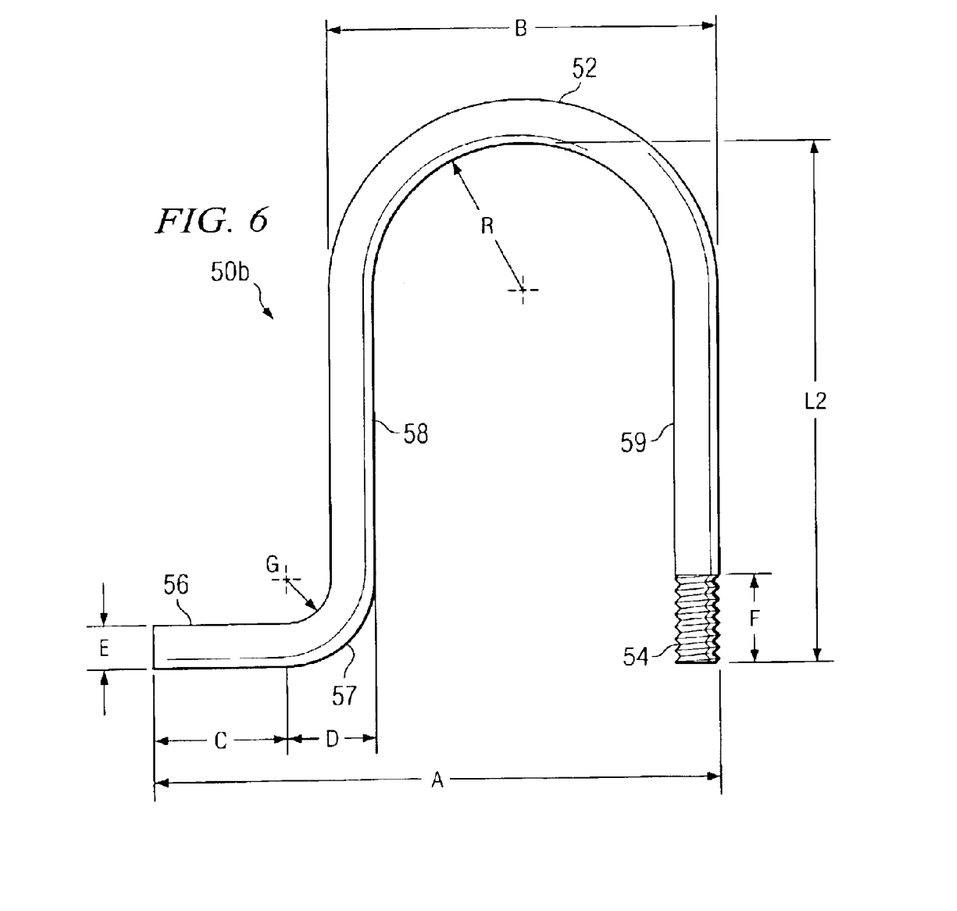
FIG. 6 illustrates a side-view of an alternative locking hook bolt member in accordance with a particular embodiment of the present invention.

FIG. 5 and 6 further illustrate bolt members 50a and 50b, respectively. A comparison of FIGS. 5 and 6 shows that the lengths L1 of each of the legs 58 and 59 of bolt member 50a are approximately half as long (as measured from the inside of the center of the curved portion to the ends of legs 58 and 59) as the lengths L2 of each of the legs 58 and 59 of bolt member 50b. Aside from that difference, bolt members 50a and 50b are constructed identically to one another, including featuring the same radius R. Thus, as illustrated in FIGS. 5 and 6, the leg length L1 of bolt member 50a is approximately equal to the radius R of arcuate portion 52 of bolt member 50a, whereas the leg length L2 of bolt member 50b is greater than the radius of arcuate portion 52 of bolt member 50b, being at least approximately twice the radius R.

As mentioned above, these differing leg lengths L1 and L2 make bolt members 50a and 50b suitable for securing cable to support post 20 in different orientations. The greater leg length L2 of bolt member 50b makes bolt member 50b suitable for securing a cable in intimate contact with flanges 34 and 36 of support post 20, as opposed to the central web 32. The lesser leg length L1 of bolt member 50a, on the other hand, makes bolt member 50a suitable for securing a cable in intimate contact with central web 32, as opposed to flanges 34 and 36. Of course, it should be understood by those skilled in the art that the lengths legs 58 and 59 of the bolt members 50 may vary depending upon the material thickness, type, and geometry of the support post 20 and still be within the teachings of the present invention.

In particular embodiments of bolt members 50a and 50b, the diameter E of the bolt member may be 8 mm (5/16 in). Locking portion 56 may have a length C of 22 mm (7/8 in). The radius G of bend 57 may be 7 mm (1/4 in), such that bend 57 has a longitudinal length D of 15 mm (9/16 in). The radius R of arcuate section 52 may be 21.5 mm (7/8 in), such that arcuate portion 52 has a longitudinal length B of 59 mm (2 5/16 in). These dimensions result in bolt member 50 having an overall longitudinal length H of 88 mm (3 7/16 in). Additionally, as mentioned above, bolt members 50a and 50b differ in that the two bolt members have different leg lengths L1 and L2, respectively. In particular embodiments, such as those described above, L1 may have a length of 38.5 mm (1 1/2 in), while L2 may have a length of 76.5 mm (3 in). Lastly, threaded portion 54 may have a length F of 17 mm (11/16 in) or longer. Of course, these dimensions are provided for illustration and example only. It should be recognized by one of ordinary skill in the art that bolt members may have other dimensions and still be within the teachings of the present invention.

Once installed, the locking hook bolt assembly of the present invention provides a stronger connection between the cables 22, 24, and 26 and support post 20, proving more effective in preventing the cables 22, 24, 26 from being disconnected or knocked loose from the supporting posts when impacted by a vehicle or other object. Only when a predetermined load is applied will the bolt release, either by the shearing of the bolt or by the straightening of the locking portion 56 of the bolt. As a result, premature failures of the bolt members are greatly reduced. This allows the cable guardrail system to use more of the available section modulus of the support posts, while releasing prior to creating vehicle override or stability problems through snagging at support post locations. This allows more of the load to be transmitted to more of the adjacent support posts, thus significantly reducing overall system deflections upon impact by errant vehicles and increasing the safety of the guardrail system. Use of the locking hook bolt system also reduces maintenance after a collision by keeping the cables affixed to more posts, and helps keep the cables in a better position to accommodate a subsequent impact prior to repair of the system.

Additionally, the strength of the locking hook bolt can be adjusted to match the strength of the support post. This can be accomplished by varying the material properties or diameter of the steel round stock from which the locking hook bolt is fabricated, and/or adjusting the length of the locking portion extending from the second leg of the locking hook bolt. In this manner, the strength of the post may be more fully utilized, but the cable is allowed to release from the support post as the capacity of the post is reached. This not only prevents the premature release of the cable from the support post, but also prevents the cable from being pulled down as the support post deforms, thus reducing the potential for vehicles to override the system.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications, and substitutions without departing from the spirit of the invention as set forth and defined by the following claims.

What is claimed is:

1. A guardrail assembly, comprising:
   a support post;
   a first locking hook bolt operable to couple a first cable to the support post;
   the first locking hook bolt having a first leg, a second leg extending generally parallel with and spaced apart from, the first leg, an arcuate portion coupling the first leg and the second leg, and a locking portion extending from, and forming an angle of approximately 90 degrees with, the second leg;
   the locking portion of the first locking hook bolt being configured to engage the support post; and
   the first leg of the first locking hook bolt having a threaded portion at an end of the first leg of the first locking hook bolt that is opposite the arcuate portion of the first locking hook bolt.

2. The guardrail assembly of claim 1, wherein a first length of the first leg and a second length of the second leg are approximately equal.

3. The guardrail assembly of claim 1, wherein a first length of the first leg and a second leg are each approximately twice a radius of the arcuate portion.

4. The guardrail assembly of claim 1, wherein a first length of the first leg and a second leg are each approximately equal to a radius of the arcuate portion.

5. The guardrail assembly of claim 3, wherein the first length of the first leg and the second length of the second leg are selected to allow the arcuate portion to extend beyond a flange of the support post by an amount sufficient to couple a cable with the flange, and secure the cable within the arcuate portion.

6. The guardrail assembly of claim 3, wherein the first length of the first leg and the second length of the second leg are selected to allow the arcuate portion to extend beyond a second surface of the central web by an amount sufficient to couple a cable with the second surface of the central web, and secure the cable within the arcuate portion.

7. The guardrail assembly of claim 1, further comprising a nut threadably coupled with the threaded portion of the first leg, the nut being configured and positioned to engage a surface of the support post to couple the first leg to the support post.

8. The locking hook bolt of claim 7, further comprising a lock washer coupled with the first leg, intermediate the surface of the support post and the nut.

9. The guardrail assembly of claim 1, wherein a first length of the first leg and a second length of the second leg are selected to allow the locking portion to engage a first surface of a central web of the support post and to allow the arcuate portion to extend beyond a flange of the support post by an amount sufficient to couple the first cable with the flange, and secure the first cable within the arcuate portion.

10. The guardrail assembly of claim 1, wherein a first length of the first leg and a second length of the second leg are selected to allow the locking portion to engage a first surface of a central web of the support post and to allow the arcuate portion to extend beyond a second surface of the central web by an amount sufficient to couple the first cable with the second surface, and secure the first cable within the arcuate portion.

11. The guardrail assembly of claim 1, further comprising:
   a second locking hook bolt operable to couple a second cable to the support post;
   the second locking hook bolt having a first leg, a second leg extending generally parallel with, and spaced apart from, the first leg, an arcuate portion coupling the first leg and the second leg, and a locking portion extending from, and forming an angle of approximately 90 degrees with, the second leg;
   the locking portion of the second locking hook bolt being configured to engage the support post; and
   the first leg of the second locking hook bolt having a threaded portion at an end of the first leg of the second locking hook bolt that is opposite the arcuate portion of the second locking hook bolt.

12. The guardrail assembly of claim 11, wherein a first length of the first leg of the first locking hook bolt and a second length of the second leg of the first locking hook bolt are selected to allow the locking portion of the first locking hook bolt to engage a first surface of a central web of the support post and to allow the arcuate portion of the first locking hook bolt to extend beyond a flange of the support post by an amount sufficient to couple the first cable with the flange, and secure the first cable within the arcuate portion of the first locking hook bolt; and
   wherein a first length of the first leg of the second locking hook bolt and a second length of the second leg of the second locking hook bolt are selected to allow the locking portion of the second locking hook bolt to engage a second surface of a central web of the support post and to allow the arcuate portion to extend beyond the first surface of the central web by an amount sufficient to couple the second cable with the first surface, and secure the second cable within the arcuate portion of the second locking hook bolt.

13. A guardrail assembly, comprising:
   a support post;
   a first locking hook bolt operable to couple a first cable with the support post;
   a second locking hook bolt operable to couple a second cable with the support post;
   the first and second locking hook bolts each having a first leg, a second leg extending generally parallel with, and spaced apart from, the first leg, an arcuate portion coupling the first leg and the second leg, and a locking portion extending from, and forming an angle of approximately 90 degrees with, the second leg;
   the locking portion of each of the first and second locking hook bolts being configured to engage the support post;
   the first leg of each of the first and second locking hook bolts having a threaded portion at an end of the first end of the first or second locking hook bolt, respectively, that is opposite the arcuate portion;
   wherein a first length of the first leg of the first locking hook bolt and a second length of the second leg of the first locking hook bolt are selected to allow the locking portion of the first locking hook bolt to engage a first surface of a central web of the support post and to allow the arcuate portion of the first locking hook bolt to extend beyond a flange of the support post by an amount sufficient to couple the first cable with the flange, and secure the first cable within the arcuate portion of the first locking hook bolt; and wherein a first length of the first leg of the second locking hook bolt and a second length of the second leg of the second locking hook bolt are selected to allow the locking portion of the second locking hook bolt to engage a second surface of a central web of the support post and to allow the arcuate portion to extend beyond the first surface of the central web by an amount sufficient to couple the second cable with the first surface, and secure the second cable within the arcuate portion of the second locking hook bolt.

* * * * *

UNITED STATES PATENT AND TRADEMARK OFFICE
CERTIFICATE OF CORRECTION

PATENT NO. : 6,948,703 B2
DATED : September 27, 2005
INVENTOR(S) : Dean C. Alberson et al.

It is certified that error appears in the above-identified patent and that said Letters Patent is hereby corrected as shown below:

<u>Column 7,</u>
Lines 31 and 34, after "first leg" insert -- second length of the --.
Line 53, after "The" delete "locking hook bolt" and insert -- guardrail assembly --.

Signed and Sealed this

Fourth Day of April, 2006

JON W. DUDAS
*Director of the United States Patent and Trademark Office*